May 23, 1939.  E. L. (GRANDDADDY) OSBORNE  2,159,224
CONVERTIBLE INTERNAL COMBUSTION LIQUID FUEL MOTOR OR ENGINE
Filed Dec. 18, 1935   6 Sheets—Sheet 4

INVENTOR.

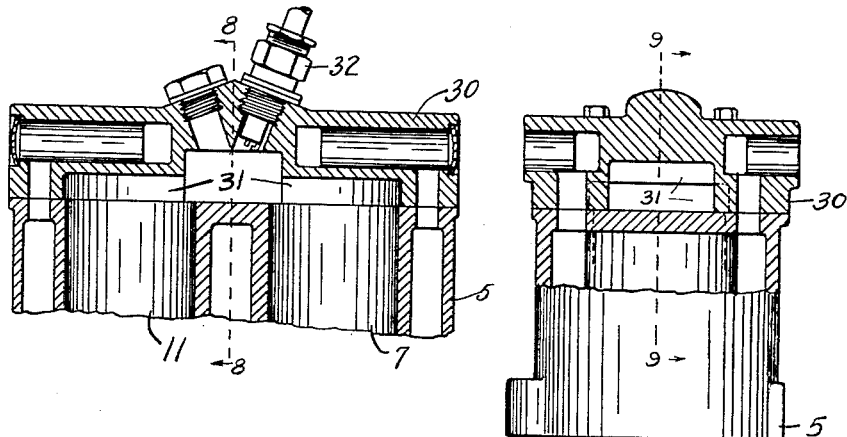
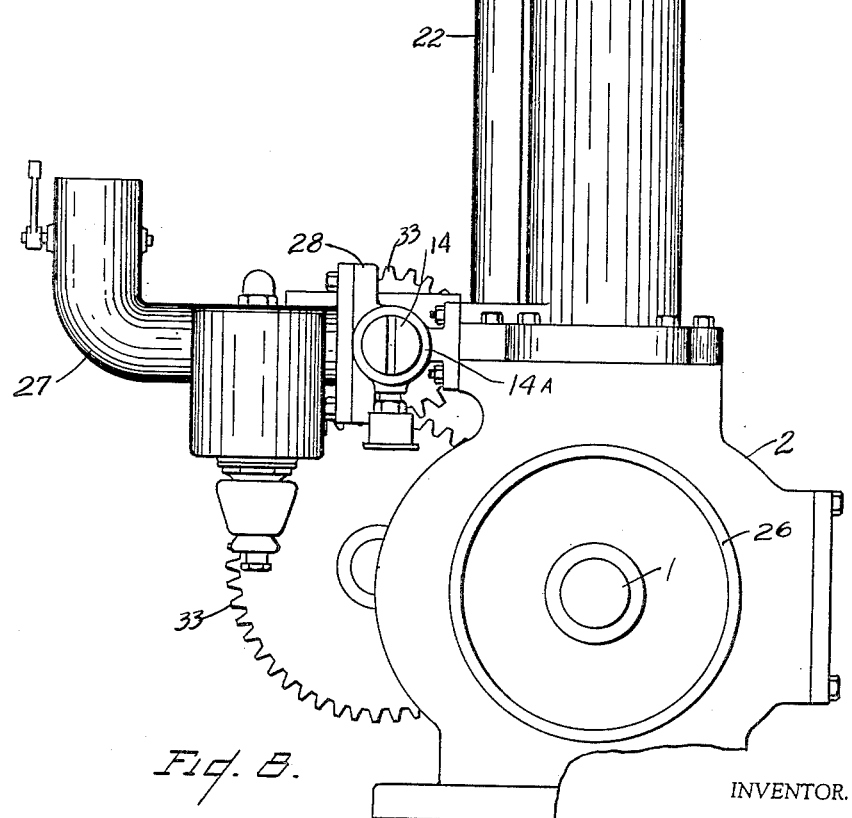

May 23, 1939.  E. L. (GRANDDADDY) OSBORNE  2,159,224
CONVERTIBLE INTERNAL COMBUSTION LIQUID FUEL MOTOR OR ENGINE
Filed Dec. 18, 1935   6 Sheets-Sheet 6

INVENTOR.

Patented May 23, 1939

2,159,224

UNITED STATES PATENT OFFICE 2,159,224

CONVERTIBLE INTERNAL COMBUSTION LIQUID FUEL MOTOR OR ENGINE

Elmer L. (Granddaddy) Osborne, Detroit, Mich., assignor to Eco Motor Works, Inc., Detroit, Mich., a non-profit, cooperative corporation of Michigan Application December 18, 1935, Serial No. 55,070

2 Claims. (Cl. 123—53)

This invention or discovery relates to improvements in internal combustion motors or engines in which gas, gasoline, or other liquid fuels are inducted or injected to a combustion chamber and connected cylinders to be burned directly against the heads of reciprocating pistons connected by a piston pin and connecting rod to a revolving crankshaft to transmit the heat expansion power thus created to a pulley or other transmission device to do useful work.

Internal combustion motors or engines up to this time have been subject to faults of construction and heat expansion power losses listed principally as follows:

(a) No practical provision to convert, at will, to use any kind of liquid fuel.

(b) No provided cushion to check reciprocating thrust in motor action.

(c) Dilution of lubricating oil by water, gasoline from over-choking in starting or by too rich setting of carburetor or metering device.

(d) Exposure of lubricating oil system to dust and dirt causing undue wear of bearings, pistons and cylinder walls.

(e) Exposure of the lubricating oil to the intense internal combustion heat causing the lubricating oil to lose its viscosity or lubricating film or body.

(f) Loss of volumetric efficiency or cylinder capacity by limited valve action, manifold restrictions, etc.—faulty induction.

(g) No relaxation in motor thrust action to retain constant lubricating oil film between metal surfaces of bearings.

(h) Too many operating parts requiring accurate adjustment and repair service in operation.

(i) Lack of sufficient flexibility range of motor speed and power.

(j) Too much consumption of power within the motor itself thus reducing the net delivered power to the useful work.

(k) Failure to fully enclose and protect working parts.

(l) Incomplete combustion and waste of the heat power of the liquid fuel used.

The object of my invention or discovery is to overcome the listed faults of construction and heat power losses by bringing together heretofore independent, and old mechanisms; and to use in combination with my new structure for improved economy, efficiency and reliability. Further, to provide ready means for the operator to use, at will, any kind of liquid fuel in the same motor or engine structure.

Figure 1:
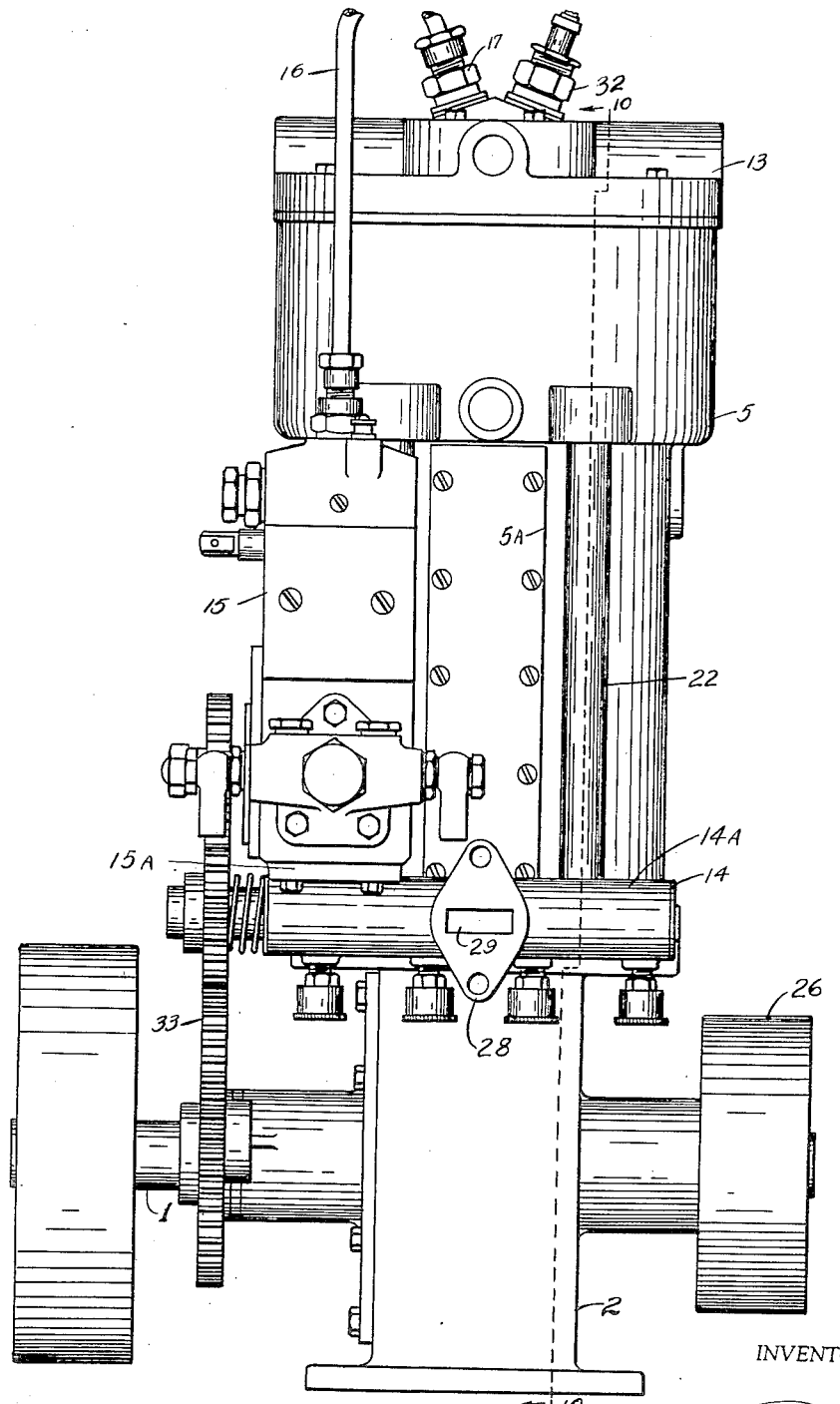
Figure 2:
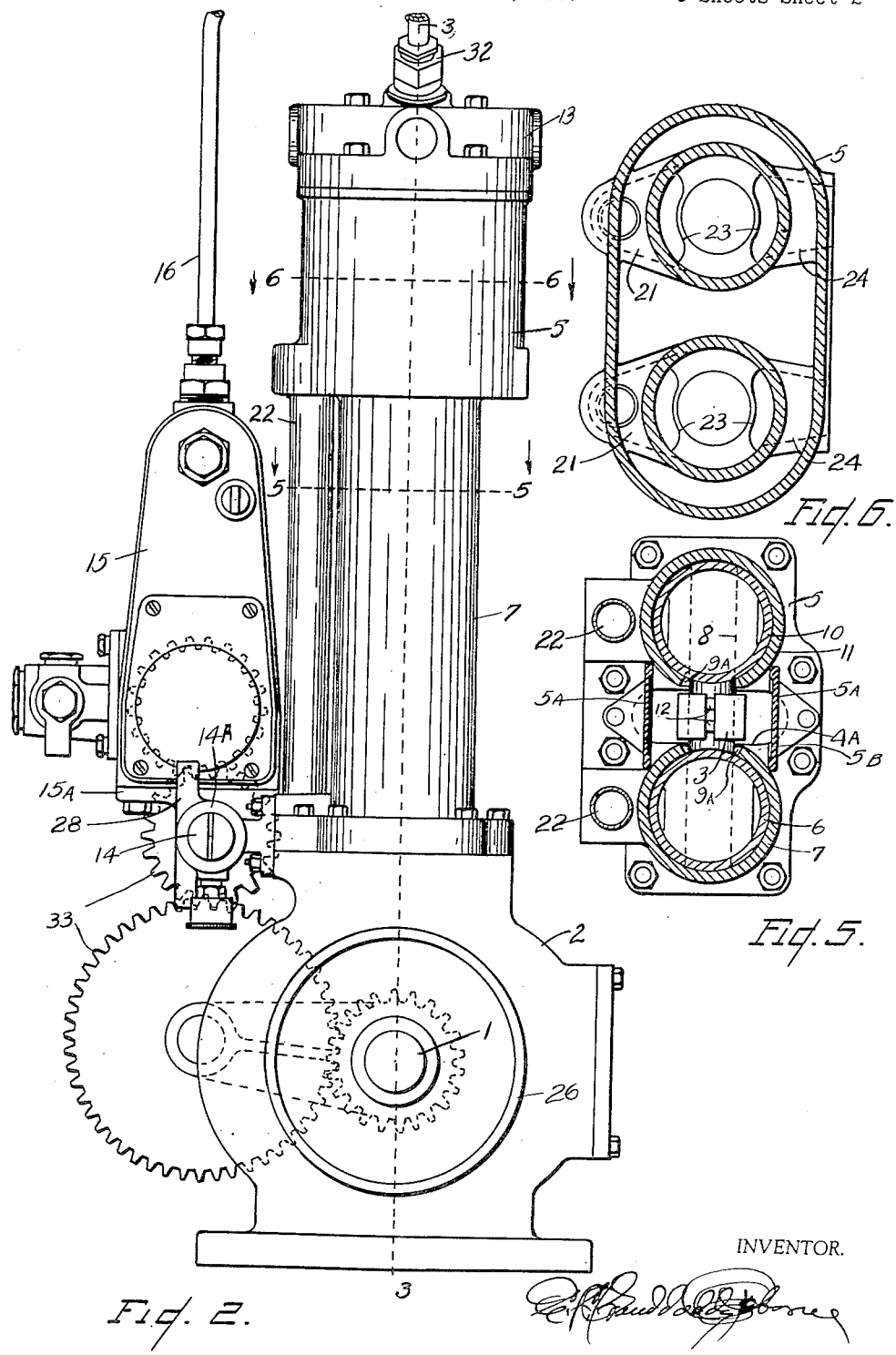
Figure 3:
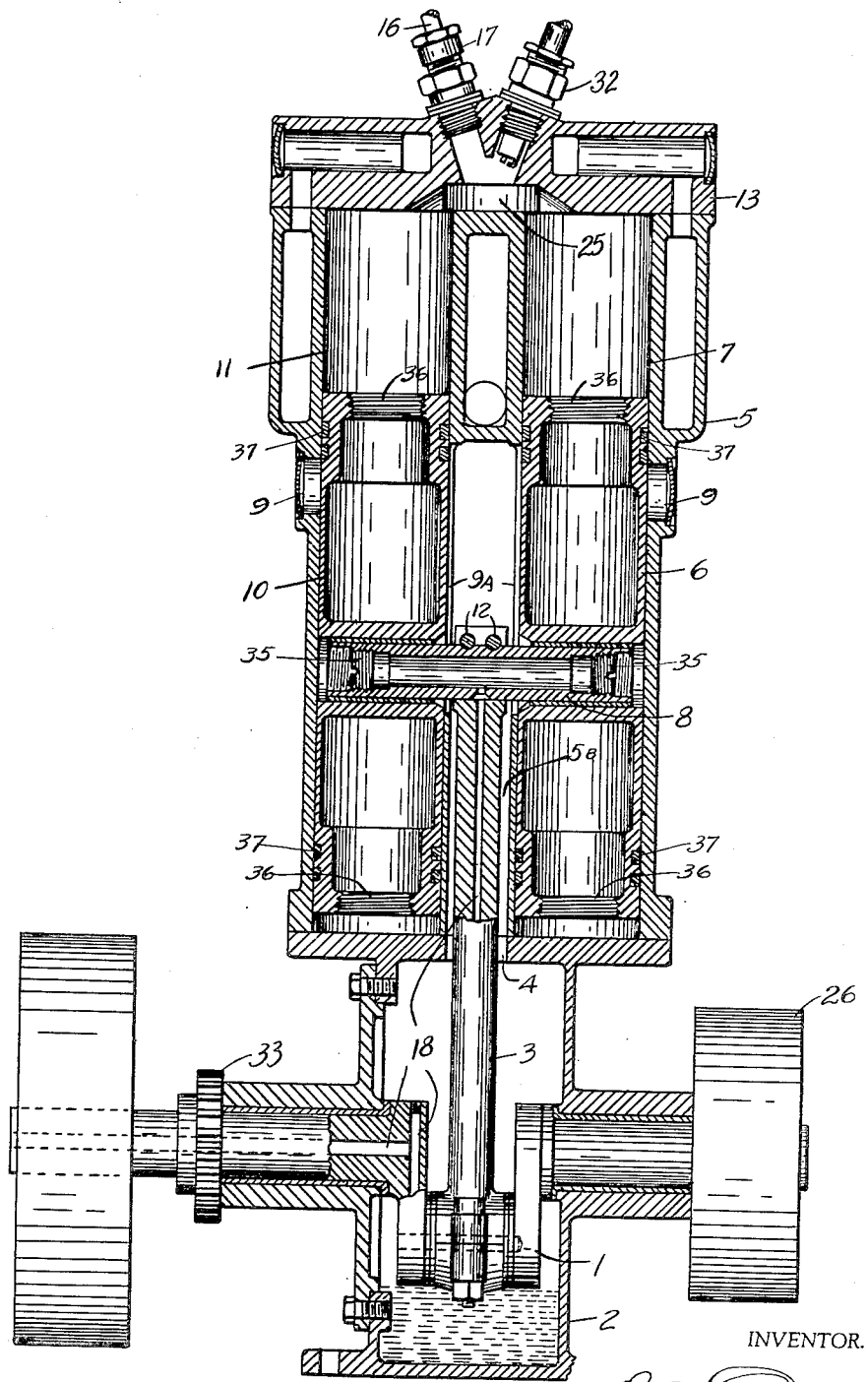
Figures 4, 7:
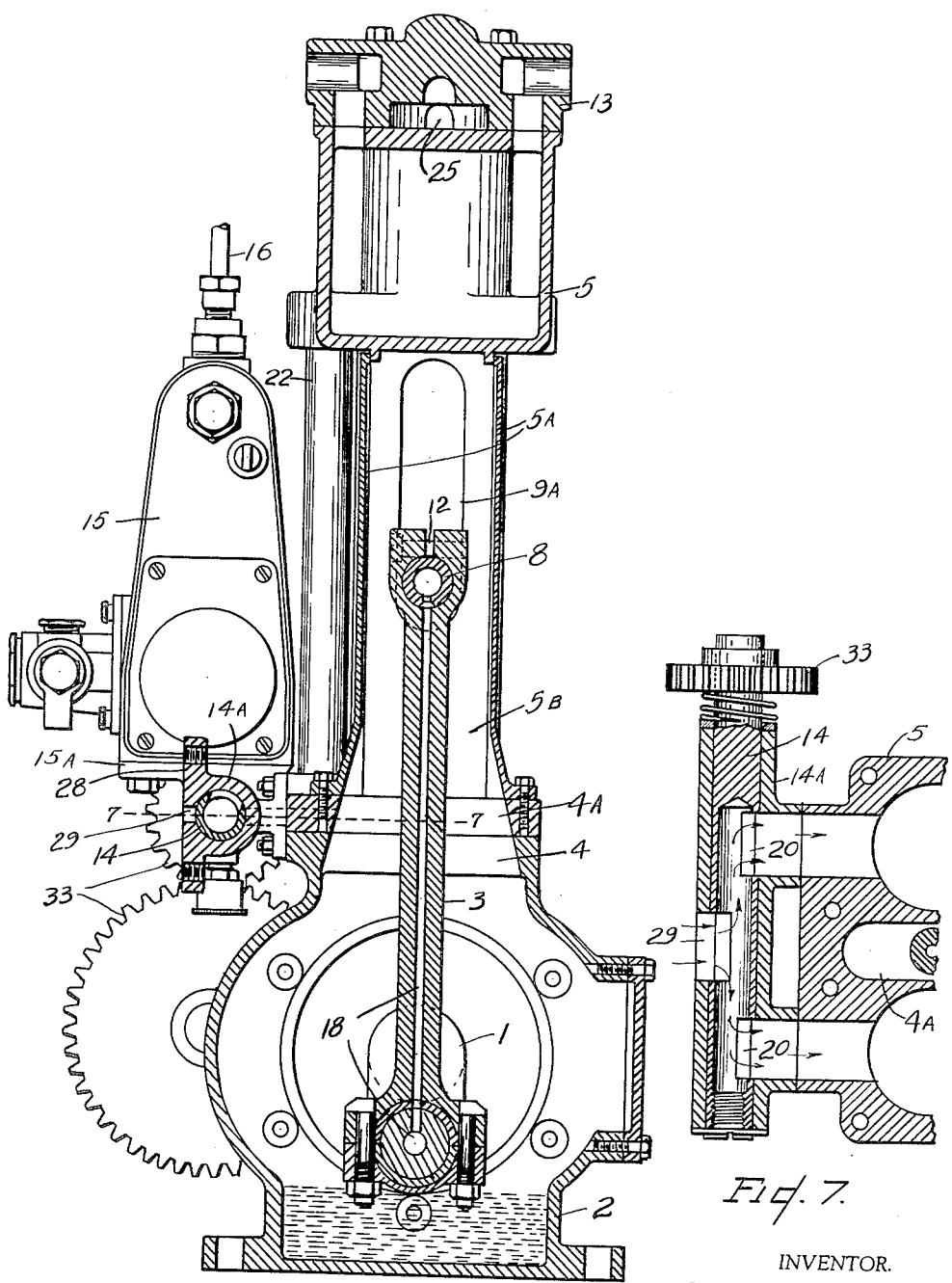
Figures 10, 11:
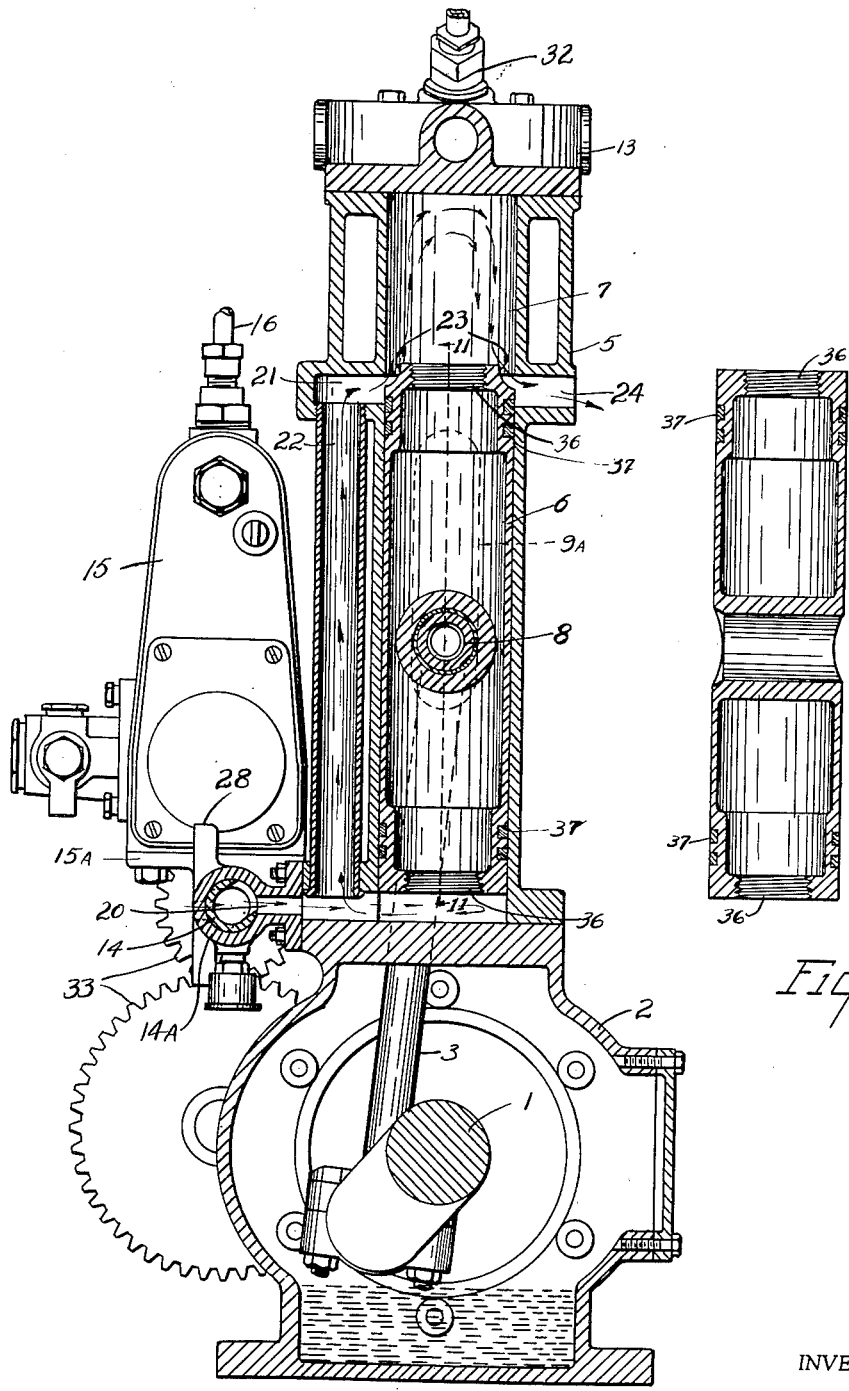

One form of my invention or discovery is illustrated by Figures 1 to 11 inclusive, found on six (6) sheets of drawings herewith; Figure 1 is an elevation side view. Figure 2 is an elevation end view. Figure 3 is a cross section view looking at the motor from the same side as in Figure 1. Figure 4 is a cross section view looking at the motor from same end as in Figure 2. Figure 5 is a cross section view looking in direction of arrows on dotted line 5—5, in Figure 2. Figure 6 is a cross section view looking in direction of arrows on dotted line 6—6, in Figure 2. Figure 7 is a cross section view taken on dotted line 7—7, indicated in Figure 4. Figure 8 combines an elevation end view and a cross section view looking in direction of arrows on dotted line 8—8, indicated in Figure 9. Figure 9 is a cross section view in direction of arrows on dotted line 9—9, found in Figure 8. Figure 10 is a cross section view indicated by direction of arrows on dotted line 10—10, found in Figure 1. Figure 11 is a cross section view indicated by direction of arrows on dotted line 11—11, in Figure 10.

In these various views, 1 is the crankshaft; 2, crankcase; 3, connecting rod; 4, slot in top of crankcase; 4—a, slot in bottom of dual cylinder block; 5, dual cylinder block; 5—a, connecting rod chamber sealed enclosure side plate; 5—b, connecting rod chamber; 6, first dual closed piston; 7, first dual cylinder bore; 8, hollow, threaded and plugged piston pin; 9, assembling hole in dual cylinder wall; 9—a, slot in inner wall of dual cylinders; 10, second dual closed piston; 11, second dual cylinder bore; 12, piston pin locking clamp screws; 13, oil burning dual cylinder head; 14, rotary manifolding inlet control; 14—a, rotary manifolding inlet control housing; 15, fuel injection pump; 14—a, fuel injection pump attaching base; 16, fuel injection discharge tube; 17, fuel spray injector; 18, lubricating oil passages to hollow, plugged piston pin lubricating oil retaining chamber; 20, rotary inlet port to dual cylinders; 21, combustion dual cylinder inlet port; 22, air, or metered air and liquid fuel mixture transfer dual passage; 23, dual piston deflectors; 24, dual cylinder exhaust ports; 25, oil burning compression chamber; 26, pulley; 27, carburetor (air and liquid fuel metering device); 28, carburetor attaching flange; 29, central rotary manifolding inlet control port; 30, low compression dual cylinder head for gasoline and light, metered air and liquid fuel mixtures; 31, compression chamber for gasoline and other light liquid fuel and air metered mixtures; 32, spark plug; 33, timing gears; 35, piston pin plug; 36, closed dual piston core plug; 37, closed dual piston compression ring.

*Description:* (a) *Construction and assembly,* (b) *Mechanical operation,* (c) *Convertible adaptations.*

(a) *Construction assembly.*—Crankshaft 1 is assembled in crankcase 2. Connecting rod 3 is then inserted from crankcase 2 through the slot 4 provided in the top of crankcase 2 and is bolted to the crank pin bearing of crankshaft 1. Dual cylinder block 5 is then assembled by projecting the top end of connecting rod 3 through slot 4—a provided in the bottom of dual cylinder block 5 which is then bolted to crankcase 2. First dual, closed piston 6 (closed at both ends with taper threaded screw plugs 36) is then inserted from the top or outer end of dual cylinder block 5 in the first dual cylinder bore 7. The plugged, lubricating oil retaining piston pin 8 is then pushed through the provided assembling hole 9 in the dual cylinder wall and through the piston pin bearing in piston 6, through the provided piston pin clearance slot 9—a in the inner wall of the dual cylinder bore 7, through the top of connecting rod 3 and through a similar piston pin clearance slot 9—a in the inner wall of dual cylinder bore 11. The second, closed dual piston 10, (identical with piston 6) is then inserted in the second dual cylinder bore 11 and the plugged, oil retaining piston pin 8 is pushed into the piston-pin bearing of piston 10. The locking clamp screws 12 are then assembled in the top of connecting rod 3. Dual cylinder head 13, or dual cylinder head 30, as desired, is then bolted to the top or outer end of duel cylinder block 5. The provided side plates 5—a are then assembled to seal, air and oil tight, the central connecting rod chamber 5—b. The rotary manifolding inlet control housing 14—a, with its rotary manifolding inlet control 14, is then bolted to the bottom of dual cylinder block 5 and to the top of crankcase 2. The fuel injection pump 15 is next assembled to its provided base 15—a on top of the rotary manifolding inlet control housing 14—a. The fuel injection discharge tube 16 is then connected to fuel spray injector 17. If the motor is being set up for metered air and liquid fuel induction the carburetor or metering device 27 is bolted to the provided flange 28 on the rotary manifolding inlet control housing 14—a; and the previously described assembly of the fuel injection pump 15 and its associated discharge parts are omitted.

In the construction of the special dual, closed piston 6 and identical piston 10, the cored openings in the ends of the piston are tapped with a taper thread for a taper plug 36 to be firmly seated and then machined with finished ends of the piston. The special deflectors, 23, formed to new structure, are cast in the top of the piston.

The special hollow, lubricating oil retaining piston pin 8 is made with an internal thread at each end and plugged with screw plugs 35. The internal thread in the ends of the piston pin 8 is tapped to sufficient depth to leave projecting internal thread for attaching a correspondingly threaded tool to withdraw piston pin 8 in disassembling the motor.

(b) *Mechanical operation.*—When closed dual pistons 6 and 10 move upward or outward in unison they create a vacuum under the bottom or inner ends of the closed dual pistons by which air is drawn through inlet ports 20 and 29, Figures 7 and 10, and preferably through a manifold air passage within the manifolding rotary inlet control 14, shown in Figures 1, 2, 4, 7, 8 and 10. (Conventional poppet valves with a connecting air inlet manifold to control the air inlet, as in ordinary internal combustion motors, may be used; but as inventor or discoverer of the new convertible, internal combustion, liquid fuel motor or engine herein described and illustrated, I prefer and recommend the manifolding rotary inlet control as shown in this specification.) As closed dual pistons 6 and 10, moving in unison, reach the top or outer end of the intake or induction stroke the manifolding rotary inlet control, 14, timed by gears 33 with actuating crankshaft 1, closes inlet ports 20 and 29. On succeeding down or inner stroke of closed dual pistons 6 and 10 the air, previously drawn in, is compressed in the bottom or inner closed end of the dual cylinders 7 and 11 to approximately 40 pounds pressure by the bottom or inner ends of closed dual pistons 6 and 10 ready for transfer to the top or outer and combustion ends of the dual cylinders. (This low pre-compression pressure also serves as a cushion for the thrust action of the closed dual reciprocating pistons, piston pin and top end of the connecting rod.) Near the end of this down or inner and pre-compression stroke the top ends of closed dual pistons 6 and 10 first uncover combustion cylinder exhaust ports 24 allowing the remaining heat expansion pressure to escape. Then the top ends of the closed dual pistons 6 and 10 uncover the combustion cylinder inlet ports 21; and the air pre-compressed by the bottom or inner ends of closed dual pistons 6 and 10 rushes from the provided dual transfer passages 22 through the inlet ports 21 and is turned upward by deflectors 23 provided in the tops of closed dual pistons 6 and 10. This air pressure thus rushing in scavenges or drives out the remaining burned gasses from the previous combustion through exhaust ports 24 and fills the dual combustion cylinders with clean, fresh air. (The direction of travel of the air as described is shown by arrows in Figures 7 and 10.) On the next upward or outward stroke of closed dual pistons 6 and 10 the inlet ports 21 and the exhaust ports 24 are closed and the fresh air is again compressed by the top or outward ends of the closed dual pistons 6 and 10, this time to a pressure range of 200 to 600 pounds compression depending on the nature of the liquid fuel to be injected for successful compression heat ignition of the liquid fuel forced into combustion chamber 25 through the liquid fuel spray injector 17; and for best combustion heat expansion power applied directly to the top of closed dual pistons 6 and 10. The liquid fuel, thus injected and ignited by the heat of the high air compression, burns and creates a heat expansion power which is applied directly and equally to closed dual pistons 6 and 10 through the equalizing compression chamber 25, Figures 3 and 4, thus driving closed duel pistons 6 and 10 downward or inwardly on a power or impulse stroke. An electric spark plug or hot coil plug 32 is used for starting only. The heat expansion power thus applied to the tops of closed dual pistons 6 and 10 is transmitted through the piston pin 8 to the connecting rod 3, thence to the revolving crankshaft 1 and to the pulley 26 or other provided driving device for delivering the heat expansion power to do useful work.

(c) *Convertible adaptations.*—Easy convertible adaptations are provided in my new internal combustion, liquid fuel motor or engine, to substitute the principles and processes of a vacuum induction of a metered liquid fuel and air mixture in place of the air induction only, and the forced, sprayed liquid fuel injection against a high, self-igniting compression pressure as described above. For example to convert my new internal combustion, liquid fuel motor or engine, for using gasoline fuel by the vacuum induction, metered gasoline and air process: The liquid fuel injection pump 15, fuel injection discharge tube 16, fuel spray injector 17 and the high compression head 13 are removed. A liquid fuel and air metering carburetor 27 is then attached to the provided flange 28 on the manifolding rotary inlet control housing 14—a and to central inlet port 29 in the manifolding rotary inlet control 14. The air and gasoline fuel mixture, metered by carburetor 27 and drawn in by vacuum induction, is pre-compressed to a low pressure by the bottom or inward ends of closed dual pistons 6 and 10 ready to be rapidly transferred to the combustion ends of the dual multiple cylinders 7 and 11 in the same manner as previously described for air only and for the forced, sprayed injection of liquid fuels. For this metered liquid fuel and air mixture induction process another head 30, Figures 8 and 9, with a larger compression chamber 31, providing for approximately 90 pounds compression pressure before mechanically timed electric ignition, is provided in place of the high compression head 13. A spark plug 32 is used to deliver an electric spark for igniting the metered gasoline and air compressed mixture to obtain the internal combustion, directly applied heat expansion power to closed dual pistons 6 and 10, as previously described in the forced, sprayed liquid fuel injection process. The mechanically timed electric spark ignition of the compressed metered gasoline and air mixture by vacuum induction is the same as is used in all commonly known gasoline motors or engines by those skilled in the arts of manufacture and operation of such motors or engines.

Any combination of the easily convertible, provided adaptations, may thus be secured in my new convertible, internal combustion, liquid fuel motor or engine to use any kind and grade of liquid fuel in its various gas, gasoline, alcohol, oil and distillate forms; and to meet the variations of requirements for compression pressures and ignition processes in a single motor or engine structure for the related objective of my invention as previously set forth.

Lubrication is accomplished from a lubricating oil supply ordinarily carried in the bottom of the sealed, air and oil tight, crank case 2 as shown in Fig. 3, Fig. 4 and Fig. 10. The lubricating oil supply may be carried in a separate tank by providing suitable passages to the sealed, air and oil tight, crank case 2. The lubricating oil feeds through the oil passages 18 in crankshaft 1 and connecting rod 3 to the oil chamber in the hollow, plugged piston pin 8.

I am aware that, prior to my invention or discovery, the vacuum induction of air, its subsequent high pressure compression followed by forced, sprayed injection of liquid fuel for self or automatic ignition and internal combustion for direct heat expansion power applied against reciprocating pistons, is not new. I also know that the vacuum induction of a metered liquid fuel and air mixture for a low pressure, non self-firing compression and for a mechanically timed ignition by an electric spark plug, is not new. I know, further, that a dual cylinder closed at both ends and fitted with dual pistons, with rings at each end, operating in unison upon a single piston pin and a single connecting rod to transmit internal combustion heat expansion power to a revolving crank shaft, is not new; and that the use of a rotary manifolding inlet control for the incoming metered air and liquid fuel mixture, is not new and patentable. My invention refers to the use of these old processes and old mechanisms brought together, in combination with my new structure, and complete enclosure and protection of a convertible, internal combustion, liquid fuel motor or engine for stated objective.

I claim:

1. A convertible internal combustion liquid fuel motor or engine comprising a hollow piston pin provided with plugs in both ends, internal projecting threads over said plugs, forming a lubricating oil chamber within the piston pin said pin attached to the outer end of the connecting rod and having lubricated working bearings in two pistons reciprocating within corresponding cylinders in combination with a sealed, air and oil tight, lubricating oil supply container and lubricating oil within the piston pin.

2. A hollow piston pin as defined in claim 1 in combination with two fully closed pistons provided with rings at both ends and having lubricated working bearings for said pin, deflectors cast integral and below the outer ends of said pistons and two cylinders, closed at both ends in which said pistons reciprocate said cylinders having individual transfer passages from their inner closed ends to their outer closed ends.

ELMER L. (GRANDDADDY) OSBORNE.